Oct. 11, 1927.

J. H. BURROW 1,645,413

REPAIR SHIELD FOR VEHICLE TIRES

Filed Nov. 2, 1926

INVENTOR.
James H. Burrow
BY
Erwin Wheeler & Woolard
ATTORNEY.

Patented Oct. 11, 1927.

1,645,413

UNITED STATES PATENT OFFICE.

JAMES H. BURROW, OF SPOKANE, WASHINGTON, ASSIGNOR TO BURROW MANUFACTURING COMPANY, OF SPOKANE, WASHINGTON, A CORPORATION OF WASHINGTON.

REPAIR SHIELD FOR VEHICLE TIRES.

Application filed November 2, 1926. Serial No. 145,744.

This invention relates to improvements in repair shields for vehicle tires and is an improvement in shields of the type disclosed in former patent granted to the Burrow Manufacturing Company, as the assignee of James H. Burrow and George A. Burrow, Reissue No. 16,341, dated May 4, 1926.

The primary object of this inventon is to provide a repair shield having contoured, overlapping, wrapping members similar to those disclosed in said reissue patent, but connected by an improved anchoring portion which more effectively engages the outer casing at its meeting margins and which allows the wrapping members to more completely and independently adjust themselves to the inner tube and to the wall of the casing than was the case with the anchoring portion disclosed in said reissue patent.

A further object of this invention is to provide a repair shield which is peculiarly adapted to be used for so called cord tires and more particularly for balloon tires, it being well known that heating and chafing tendencies are much more pronounced in cases where repair shields are used in tires having loose fabrics and subject to low pressures.

A further object of this invention is to provide wrapping members similar to those disclosed in said reissue patent with a connecting means or anchoring portion having the characteristic of comparative rigidity to a sufficient extent to accomplish the purpose of the relatively rigid anchoring portion described in the former patent, but having a central, longitudinal, flexible zone for registration with the meeting margins of the tire casing whereby increased anchorage may be secured and independent adjustment of the wrapping members permitted.

In the drawings.

Like parts are identified by the same reference characters throughout the several views.

The wrapping members 1 and 2 of the shield herein disclosed are manufactured on suitable mandrels contoured in such a manner as to shape the wrapping members in conformity to the curvature of the surface which receives them, i. e., in such a manner that when the wrapping members are wrapped about the inner tube, they will conform to the curvature of the surfaces to which they are applied without wrinkling and without distortion. These wrapping members are preferably formed of cord tire fabric having rubber coated cords and with the layers of fabric separated by interposed layers of rubber. These members may be vulcanized and thus permanently contoured while on the mandrel or shaping form. The wrapping members may be conveniently formed of superposed layers or plies, the wrapping member 1 being illustrated as composed of plies $a$, $b$ and $c$ and the wrapping member 2 being illustrated as being composed of two plies $a'$ and $b'$. The superposed plies are of successively reduced size with relatively flexible free margins as disclosed in said former patent, but a less number of plies and a greater quantity of rubber between them will preferably be used. If made of cord fabric, these wrapping members will, therefore, have greater individual flexibility than those disclosed in said former patent.

Figure 1:
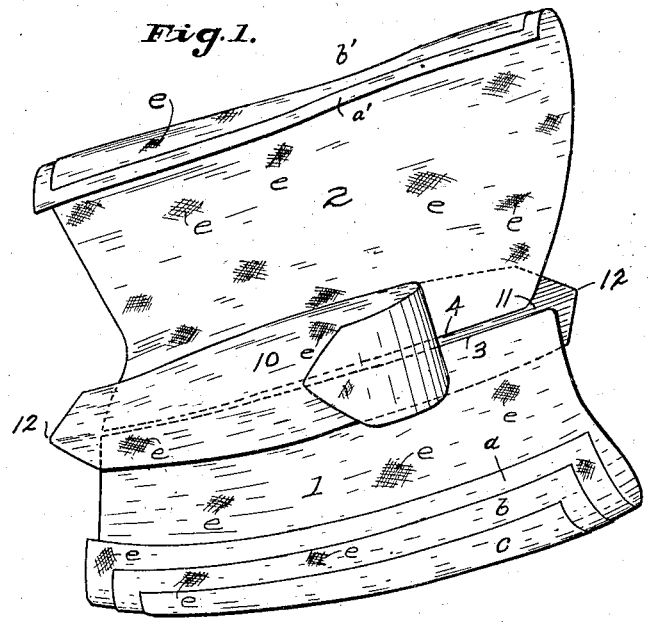
Figure 1 illustrates the repair shield as viewed from the inner side, with the wrapping members partially unfolded, and one of the anchoring connecting members partially removed.

The inner margins 3 and 4 of the respective wrapping members 1 and 2 are juxtaposed and connected by strips of canvas 10 and 11, which are respectively applied to the inner and outer surfaces of the wrapping members along the margins 3 and 4 and secured thereto by cementing or vulcanizing them to such surfaces and by stitching, if desired. The strips 10 and 11 are preferably flexible, and when so applied and secured to the respective wrapping members, they form a flexible connecting joint. These connecting strips are preferably extended beyond the ends of the wrapping members and are tapered from their side margins to their extremities 12, as clearly shown in Figures 1 and 2.

The entire shield, as thus constructed, will then be coated on both the inner and the outer surfaces with a friction reducing or anti-friction material, such as a penetrating composition of soapstone, cement, and rubber solvent. This coating is applied by dipping the shield in a solution of said material, whereupon the shield becomes encased in a white jacket of a material which may aptly be referred to as a lubricant. The effective anchorage of the shield makes the use of this lubricant possible.

Figure 2:
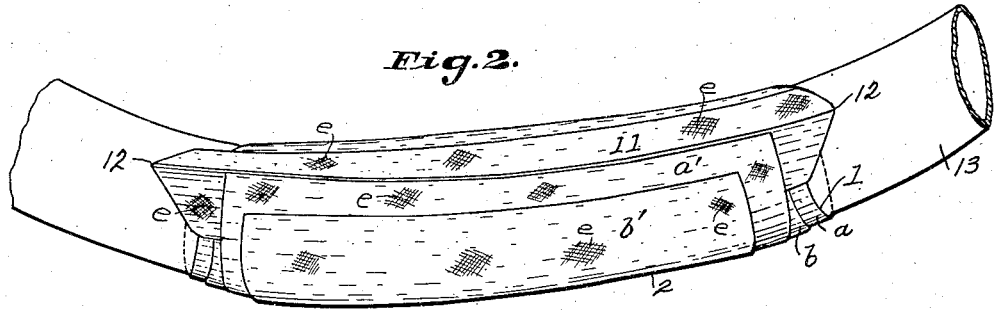
Figure 2 is a view of the improved repair shield as it appears when applied to the inner tube of an automobile tire and viewed from the inner side.
Figure 3:
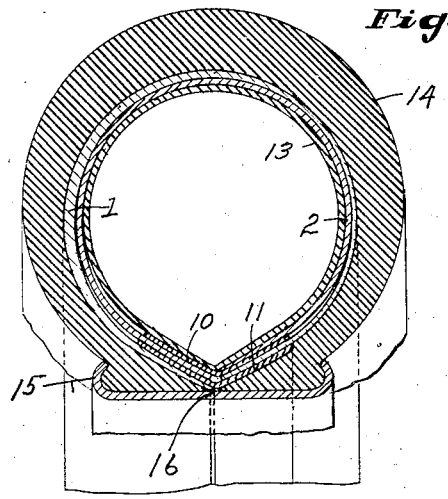
Figure 3 is a cross section of an automobile tire and rim drawn to a radial plane intersecting a repair shield applied thereto.

The connecting strips 10 and 11, together with the parts of the wrapping members 1 and 2 embraced between them, constitute an anchoring portion for the shield, these connecting strips 10 and 11 and the associated parts of the wrapping members being applied to the inner side of the tire tube 13, as shown in Figure 2, and having a normal shape substantially conforming to the contour thereof. The wrapping member 1 is applied directly to the tube 13, and the shorter or narrower wrapping member 2 is then wrapped about it, as clearly shown in Figure 2, whereupon the tube will be inserted in the casing 14, the casing applied to the rim 15, and the inner tube inflated in the usual manner. When the inner tube is inflated, the flexible connection between the wrapping members 1 and 2 will allow each of these wrapping members to independently conform to the surfaces of the tube 13 and the casing 14. The juxtaposed margins 3 and 4 of the wrapping members will, of course, tend to separate, and the flexible connecting members 10 and 11, particularly the member 11, will tend to force into the casing joint 16 between the portions of the casing which are engaged by the vehicle rim 15. The parts of the wrapping members 1 and 2 which are embraced by the connecting strips 10 and 11 become relatively rigid by reason of the added thickness, due to the presence of the strips 10 and 11 and the cement or other connecting material. Therefore, the semi-rigid anchorage, sought by the anchoring portion employed in the structure disclosed by the said reissue patent, is attained to a considerable degree in the improved structure herein disclosed without in any way affecting the adaptability of the wrapping members 1 and 2 for independent conformity to the surfaces to which they are applied. Also the increased flexibility along the longitudinal center line of the connecting members 10 and 11 allows these members and particularly the member 11 to secure additional anchorage in the joint or angle formed by the rim engaged portions of the casing.

While it is the purpose to manufacture the repair shield herein disclosed in different sizes, each adapted to fit a tire of certain dimensions, yet the flexible connection along the center line of the anchoring portion of my improved shield will permit sufficient independent adjustments of the wrapping members to make it possible to use the shield for tires of slightly larger or slightly smaller size. The relatively rigid parts of the anchoring portion prevent rotative creeping of the shield, and the flexible central anchorage at the casing joint not only adds to the anchorage in this regard but also contributes to an anchorage with the casing which effectively prevents longitudinal creeping.

Great importance is attached to the fact that the members 1 and 2 of the improved shield may be independently contoured and, therefore, more exactly contoured than would otherwise be possible; also to the fact that the connection above described allows a degree of independent adjustment, which, although slight, is important in allowing perfect conformity of each member to the surface which it embraces. This is particularly important in view of the degree of rigidity imparted to the members 1 and 2 when shaped and vulcanized.

I claim:

1. A repair shield comprising a set of wrapping members, each separately contoured to substantially conform to the curvature of an inflatable tire tube in superposed relation to each other, and a relatively flexible anchoring connection between said wrapping members also adapted to conform to the surface of said tube on the inner side.

2. A repair shield comprising a set of wrapping members, each separately contoured to substantially conform to the curvature of an inflatable tire tube in superposed relation to each other, and a relatively flexible anchoring connection between said wrapping members also adapted to conform to the surface of said tube on the inner side, said wrapping members being relatively rigid along their connected margins as compared with their other portions.

3. A repair shield comprising a set of wrapping members, each separately contoured to substantially conform to the curvature of an inflatable tire tube in superposed relation to each other, and a relatively flexible anchoring connection between said wrapping members also adapted to conform to the surface of said tube on the inner side, said wrapping members being relatively rigid along their connected margins as compared with their other portions, and of progressively increasing flexibility along their other margins.

4. A repair shield comprising a set of independently contoured wrapping members, each composed of a set of adhesively connected plies of progressively decreasing dimensions outwardly from its inner surface, said wrapping members having margins juxtaposed and flexibly connected.

5. A repair shield comprising a set of independently contoured wrapping members, one having a normal contour conforming to the surface of a tire tube of given dimensions and the other having a normal contour conforming to the normal curvature of the outer surface of the first mentioned wrapping member, and flexible anchorage strips connecting juxtaposed margins of the wrapping members, said margins and connecting strips being adapted to conform to the inner faces of a tire tube and casing when interposed between them.

6. A repair shield comprising a set of independently contoured wrapping members, one having a normal contour conforming to the surface of a tire tube of given dimensions and the other having a normal contour conforming to the normal curvature of the outer surface of the first mentioned wrapping member, and flexible anchorage strips connecting juxtaposed margins of the wrapping members, said margins and connecting strips being adapted to conform to the inner faces of a tire tube and casing when interposed between them, said anchoring strips embracing and relatively stiffening the wrapping members along said connected margins and their axial central portions being adapted to be pressed partially between the rim engaging portions of a tire casing when the tube is inflated.

7. A repair shield comprising a set of wrapping members permanently shaped for superposed embrace from opposite sides about an inflatable tube, and a flexible connection between those margins of said wrapping members which are adapted to conform to the tube on the inner side, said wrapping members being relatively thick and rigid along their connected margins and of progressively increasing thinness and flexibility along their outer margins.

8. A repair shield having a pair of permanently contoured wrapping members composed of fabric impregnated with rubber, the contour of one wrapping member being such as to conform to a tire tube of a given dimension and the other wrapping member being contoured to embrace the central portion of the first, and a set of connecting anchoring strips of fabric connecting the inner margins of said wrapping members, said anchoring strips being secured to the surfaces of the wrapping members along the connected margins and having tapered extremities extending beyond such margins.

9. A repair shield comprising a pair of contoured wrapping members composed of cord fabric and having normal contours conforming to those required for successive wrapping about an inner tube in superposed relation to each other, a relatively flexible anchoring connection between said wrapping members, and a coating of anti-friction material for said wrapping and anchoring members.

10. A repair shield comprising a pair of independently contoured wrapping members composed of plies of cord fabric having the cords and also the plies separated by layers of rubber, said wrapping members being normally curved for superposed embrace of and conformity with the contour of a portion of an inflatable tire tube, said members having juxtaposed margins flexibly connected and also having their inner and outer surfaces impregnated and coated with anti-friction material.

JAMES H. BURROW.